(12) United States Patent
Rutkowski

(10) Patent No.: US 7,089,531 B2
(45) Date of Patent: Aug. 8, 2006

(54) METHOD AND DEVICE FOR GENERATING OR EDITING NC PROGRAMS

(75) Inventor: Christian Rutkowski, Traunstein (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 522 days.

(21) Appl. No.: 10/264,584

(22) Filed: Oct. 4, 2002

(65) Prior Publication Data

US 2003/0088329 A1  May 8, 2003

(30) Foreign Application Priority Data

Oct. 4, 2001  (DE) ............................ 101 49 147

(51) Int. Cl.
*G06F 9/44* (2006.01)
(52) U.S. Cl. ...................... 717/113; 717/115
(58) Field of Classification Search ......... 717/106–119
See application file for complete search history.

(56) References Cited

U.S. PATENT DOCUMENTS

| | | | |
|---|---|---|---|
| 5,831,407 A * | 11/1998 | Ouchi et al. ................ | 318/567 |
| 5,933,353 A * | 8/1999 | Abriam et al. .............. | 700/182 |
| 5,980,078 A | 11/1999 | Krivoshein et al. | |
| 5,986,425 A * | 11/1999 | Onishi et al. ............... | 318/569 |
| 6,226,787 B1 | 5/2001 | Serra et al. | |

FOREIGN PATENT DOCUMENTS

| | | |
|---|---|---|
| DE | 197 07 107 | 9/1998 |
| EP | 0 336 975 | 10/1989 |
| EP | 0 643 342 | 3/1995 |

OTHER PUBLICATIONS

Kang, "TCAM/McEdit for Windows V1.0", TCAM Development House, Taipei, pp. i-ii, 1-31, 1999.*
Graphical Support for NC-Programming—(Graphische Unterstuetzung fuer die NC-Programmierung), ZWF Zeitschrift Fur Wirtschaftliche Fertigung Und Automatisierung, Carl Hanser Verlag. Munchen, DE, vol. 85, No. 12, Dec. 1, 1990.

* cited by examiner

*Primary Examiner*—Ted T. Vo
(74) *Attorney, Agent, or Firm*—Kenyon & Kenyon LLP

(57) ABSTRACT

On the graphical user interface of a numerical control, NC blocks are displayed in an overall functional display. An NC block is composed of a plurality of syntax elements, of which merely a subset is displayed in the overall functional display. In this context, one is able to configure which of the syntax elements is displayed. Only after one of the NC blocks is selected are all syntax elements of the selected NC block shown in a detailed display.

16 Claims, 2 Drawing Sheets

METHOD AND DEVICE FOR GENERATING OR EDITING NC PROGRAMS

CROSS-REFERENCE TO RELATED APPLICATIONS

The present application claims priority to Application No. 101 49 147.6, filed in the Federal Republic of Germany on Oct. 4, 2001, which is expressly incorporated herein in its entirety by reference thereto.

FIELD OF THE INVENTION

The present invention is directed to a method for generating or editing NC programs. The present invention is also directed to a device for generating or editing NC programs.

BACKGROUND INFORMATION

In present day machine tools, numerical controls are used to machine workpieces on the basis of an NC program. These NC programs are processed by the numerical control, which, for its part, controls the machine tool and initiates the necessary machining steps. These steps can include, for instance, choosing the tool, guiding the workpiece on a tool path, or switching on and off cooling agents. As machine tools become more and more efficient, NC programs are keeping pace with this development. For that reason, generating or editing an NC program constitutes an important step in the machining of workpieces using numerically controlled machine tools, and one that is requiring ever more outlay. Therefore, it is important to support the developer of such an NC program in the best way possible, so that he or she will be able to solve large and complex programming tasks efficiently and accurately.

To that end, European Published Patent Application No. 0 643 342 describes a method for generating and/or editing NC programs, which allows a structured representation of an NC program. For this, groups of syntax elements are combined into NC blocks and provided with comments. In a split screen display, an overall view of the NC program is then shown on the basis of the comments, and the complete NC program is also shown. The representation of the NC program itself, in which, after all, the NC program is entered or edited, is not further structured in the process, and the outlay required for generating or editing the program is increased by entering the comments. On the basis of the comments, an overview of the structure of the NC program may, in fact, be provided, but details are not made accessible.

SUMMARY

It is an object of the present invention to provide a method for generating or editing NC programs, which allows a clear presentation of the NC program and, thus, facilitates its simple generation or editing.

A further object of the present invention is to provide a device which will provide a clear overall view of an NC program and thereby enable it to be simply generated or edited.

The above and other beneficial objects of the present invention are achieved by providing a method and device as described herein.

To generate or edit an NC program on a graphical user interface, it is proposed, to produce an overall functional display of the NC program on the basis of NC blocks, which are each made up of one or of a plurality of syntax elements.

In this context, with each NC block, a subset of its syntax elements is displayed. This enables the programmer to easily get an overview of the processed NC program. For each NC block, one may configure which syntax elements are to be considered as important and, thus, belong to the subset to be shown in the overall functional display. This allows the method for generating or editing an NC program to be adaptable to a wide variety of circumstances.

DETAILED DESCRIPTION

An NC program for a numerical control of a machine tool can be organized in NC blocks containing one or more syntax elements. Thus, for example, in an NC block for defining a raw part to be machined, syntax elements may occur which enable the material of the raw part to be defined, the raw part to be aligned with respect to a machine axis, as well as with respect to the coordinates of the front right and rear left corner of a cuboid fully containing the raw part.

Another example of an NC block is the selection of a tool. Here, for instance, syntax elements may be necessary to determine the actual tool, the spindle axis assigned to the tool, the spindle speed and the tool feed rate. In the programming according to DIN 66025, one set corresponds to the NC block; the words of one set correspond to the syntax elements.

Figure 1:
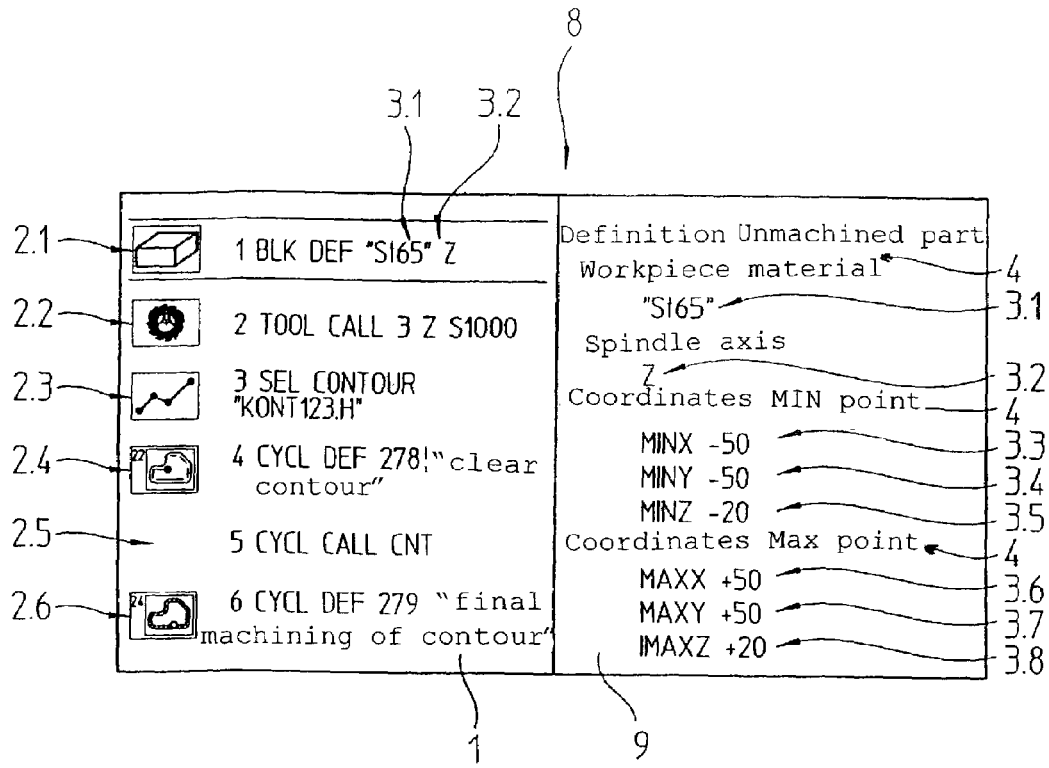
FIG. 1 illustrates a graphical user interface of a numerical control including an overall functional display.

As illustrated in FIG. 1, an NC program in an overall functional display is able to be represented on a graphical user interface 8 of a numerical control, in that a list of NC blocks 2.1–2.6 is displayed which constitute the NC program or a part thereof. Without glancing at a complete list of syntax elements 3.1–3.8, an overview of the NC program may be obtained in this manner. However, to be able to better comprehend the contents of each NC block 2.1–2.6, in accordance with the present invention, a subset of all syntax elements 3.1–3.8 for each NC block 2.1–2.6 is already displayed in the overall functional display 1. Thus, in FIG. 1, for NC block 2.1, syntax elements 3.1 and 3.2 are displayed as a subset of all syntax elements 3.1–3.8 of NC block 2.1 in overall functional display 1.

Since present-day numerical controls are used on a great variety of machine tools and for very different purposes, one may configure which subset of syntax elements 3.1–3.8 of an NC block 2.1–2.6 is already displayed in overall functional display 1. Thus, in an NC block 2.2, to select a tool, the finishing allowance of a tool will play a critical role when the controlled machine tool is a milling machine, while the finishing allowance for a drilling machine does not have any significance. In the same manner, the specification of the spindle axis as syntax element 3.2 in an NC block 2.1 is only important when the controlled machine tool has more than one spindle axis.

The subset of syntax elements 3.1–3.8 to be displayed with NC blocks 2.1–2.6 may be configured, for example, using a modifiable table, in which for each NC block 2.1–2.6, all syntax elements 3.1–3.8 are listed, together with information as to whether, in each instance, there should be a display in overall functional display 1.

If, at this point, an NC block 2.1–2.6 illustrated in overall functional display 1 is chosen, then all syntax elements 3.1–3.8 of NC block 2.1–2.6 are displayed in the detailed display 9. This may be accomplished by using a split screen area on graphical user interface 8, as illustrated in FIG. 1. Overall functional display 1 and detailed display 9 are shown at the same time. A separate window may also be opened to show all syntax elements 3.1–3.8 of an NC block 2.1–2.6, or overall functional display 1 may be replaced by detailed display 9.

When showing all syntax elements 3.1–3.8 of an NC block 2.1–2.6 in detailed display 9, the overall view is improved by combining the same kind of syntax elements 3.1–3.8 under a descriptive heading 4. Actual syntax elements 3.1–3.8 may be optically highlighted, to quickly indicate to the programmer the places where entries or changes are possible. In FIG. 1, for example, an indentation of syntax elements 3.1–3.8 relative to headings 4 is discernible. However, a color highlighting or underlining are some of the many other ways to offset elements 3.1–3.8 in detailed display 9.

Figure 2:
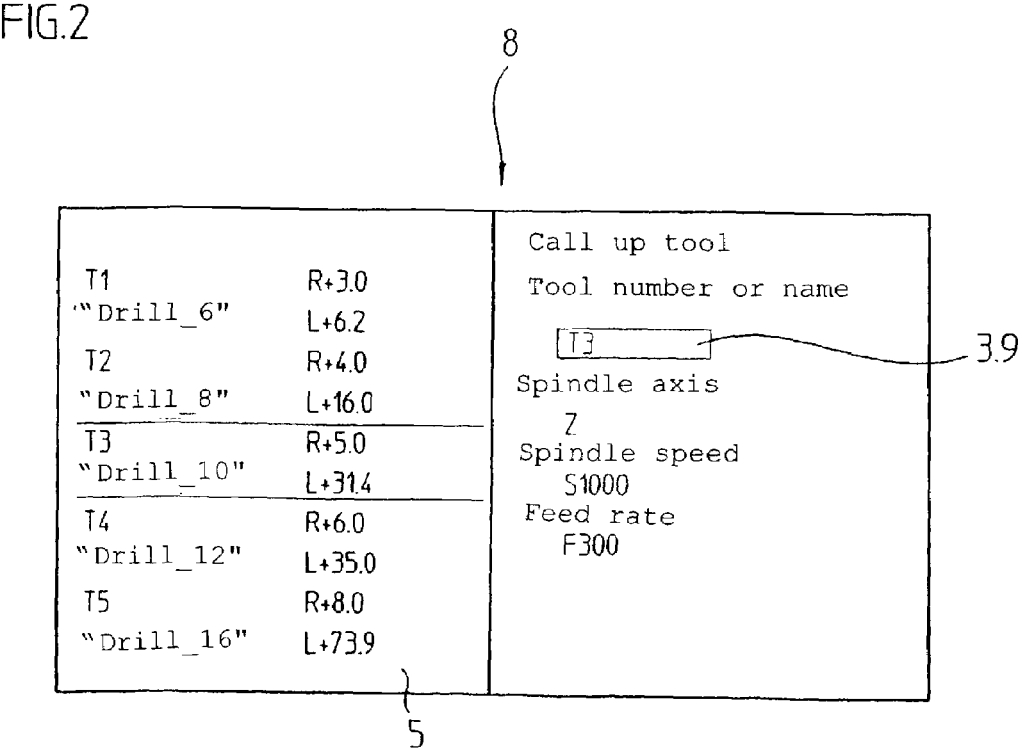
FIG. 2 further illustrates a graphical interface of a numerical control including a set of tools provided for selection.

FIG. 2 illustrates another exemplary embodiment to support the programmer in creating an NC program. When entering a specific value for a syntax element 3.9, where a selection is to be made from a predetermined set 5, predetermined set 5 is displayed on graphical user interface 8. Thus, for example, when entering a tool in an NC block 2.2, to invoke a tool change (TOOL CALL), a list of all available tools may be offered. As illustrated in FIG. 2, to this end, overall functional display 1 may be replaced by the list of all available tools until a selection is made.

Figure 3:
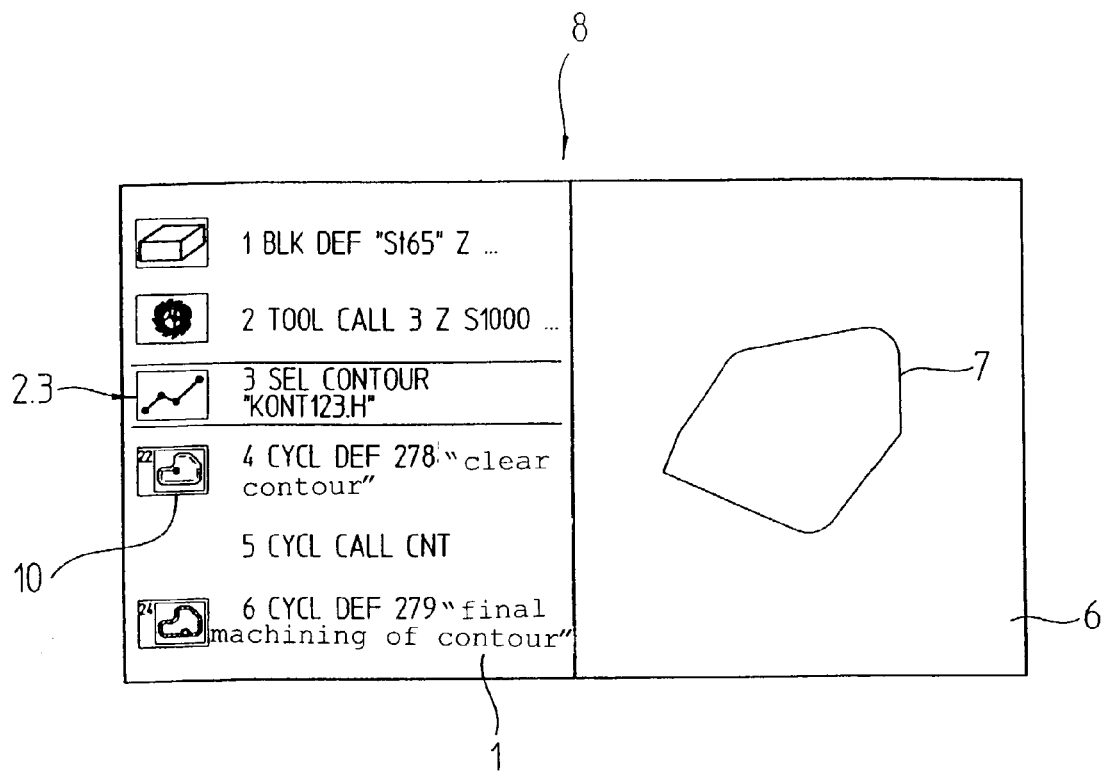
FIG. 3 further illustrates a graphical interface of a numerical control including a graphical display of a contour.

FIG. 3 illustrates how after selecting an NC block 2.3 to describe a contour (SEL CONTOUR), a graphic representation 6 of contour 7 is displayed. This graphic representation 6 may be displayed, for example, instead of detailed display 9, or in another area of graphical user interface 8. Since it is possible, in an NC block 2.3, to call up a subroutine describing a contour 7, the name of the invoked subroutine (KONT123.H) is illustrated in FIG. 3 with NC block 2.3 as the only syntax element.

While entering syntax elements 3.1–3.8 of an NC block 2.3 to directly describe a contour 7 (thus without invoking a subroutine), overall functional display 1 may be replaced by graphic representation 6 to be able to recognize the effect of individual syntax elements 3.1–3.8 on contour 7. As a last supportive measure when generating or editing an NC program, it is also mentioned that in overall functional display 1, pictographs 10 may be added to NC blocks 2.1–2.6. To the extent possible, these pictographs 10 may describe the function of the particular NC block 2.1–2.6 and may correspond, for example, to the pictographs used already when a new NC block 2.1–2.6 is activated using a graphically configured soft key of graphical user interface 8. In order to have more space, when needed, for displaying important syntax elements 3.1–3.8 for each NC block 2.1–2.6, the display of pictographs 10 may be able to be turned off, however.

Figure 4:
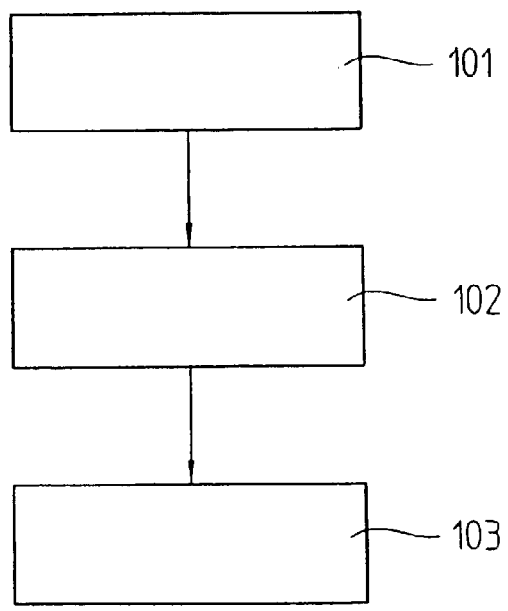
FIG. 4 illustrates a method for generating or editing NC programs.

FIG. 4 summarizes steps of a method for generating or editing NC programs which lead to a well arranged representation of an NC program and, thus, permit simple generation or editing.

Step 101 configures which subset of all syntax elements 3.1–3.8 of each NC block 2.1–2.6 may be displayed in overall functional display 1. By repeating this step, the method for generating or editing NC programs may be adapted to widely varying conditions.

In a step 102, a list of NC blocks 2.1–2.6 is displayed in overall functional display 1, for each NC block, merely the subset of its syntax elements 3.1–3.8 configured in step 101 being displayed.

In a step 103, one of NC blocks 2.1–2.6 illustrated in overall functional display 1 is selected, and a detailed display 9, including all syntax elements 3.1–3.8 of selected NC block 2.1–2.6 is displayed.

What is claimed is:

1. A method, comprising:
   (a) displaying, on a first subsection of an electronic display device, an indication of at least one NC block of an NC program, the at least one NC block including a plurality of command parameters, the indication of the at least one NC block including a subset of the plurality of command parameters, the subset including less than all of the command parameters of the NC block;
   (b) predetermining the subset of the command parameters of the at least one NC block displayed in the first subsection of the electronic display device in the displaying step (a);
   (c) selecting, by an input device, an indication of an NC block displayed on the first subsection of the electronic display device in the displaying step (a); and
   (d) displaying, in a second subsection of the electronic display device, all of the command parameters of the NC block selected in the selecting step (c).

2. The method according to claim 1, further comprising: combining a same kind of command parameter under a descriptive heading when displaying all of the command parameters of the NC block in the second subsection of the electronic display device in the displaying step (d).

3. The method according to claim 1, further comprising: optically highlighting in the second subsection of the electronic display device parts of the command parameters which are at least one of editable and inputable.

4. The method according to claim 1, further comprising: displaying during inputting of a command parameter a predefined set from which a selection is to be made.

5. The method according to claim 1, further comprising: displaying, on the electronic display device, a graphic display of a contour described in a contour-describing NC block after the contour describing NC block is selected in the selecting step (c).

6. The method according to claim 1, wherein indications of NC blocks in the first subsection of the electronic display device are optionally displayed in the displaying step (a) by a pictograph.

7. The method according to claim 1, wherein the first subsection of the electronic display device and the second subsection of the electronic display device are simultaneously displayed on the electronic display device.

8. A device, comprising:
   an electronic display device configured to display, in a first subsection of the electronic display device, an indication of at least one NC block, the at least one NC block including at least one command parameter, and configured to display a subset of the NC block command parameters of the at least one NC block, the subset of the command parameters including less than all of the command parameters of the NC block; and an input arrangement adapted to select an indication of an NC block displayed on the first subsection of the electronic display device, the electronic display device configured to display, in a second subsection of the electronic display device, all of the command parameters of the NC block selected by the input arrangement.

9. The device according to claim 8, wherein the subset of the at least one command parameter of the at least one NC block shown in the first subsection of the electronic display device is predeterminable.

10. The device according to claim 8, wherein the electronic display device is configured to simultaneously display the first subsection and the second subsection.

11. The device according to claim 9, wherein the electronic display device is configured to display a detailed display to show all of the command parameters of a selected NC block.

12. A device, comprising:
an electronic display device configured to display, in a first subsection of the electronic display device, an indication of at least one NC block, the at least one NC block including at least one command parameter, and configured to display a predetermined subset of the NC block command parameters of the at least one NC block, the subset of the command parameters including less than all of the command parameters of the NC block; and
an input arrangement adapted to select an indication of an NC block displayed on the first subsection of the electronic display device, the electronic display device configured to display, in a second subsection of the electronic display device, all of the command parameters of the NC block selected by the input arrangement.

13. The device according to claim 12, wherein the electronic display device is configured to display a second subsection to show all of the command parameters of a selected NC block.

14. The device according to claim 12, wherein the electronic display device is configured to simultaneously display the first subsection and the second subsection.

15. A method, comprising:
(a) displaying, on a first subsection of an electronic display device, an indication of at least one NC block of an NC program, the at least one NC block including a plurality of command parameters, the indication of the at least one NC block including a subset of the plurality of command parameters, the subset including less than all of the command parameters of the NC block;
(b) selecting, by an input device, an indication of an NC block displayed on the first subsection of the electronic display device in the displaying step (a); and
(c) displaying, in a second subsection of the electronic display device, all of the command parameters of the NC block selected in the selecting step (b).

16. The method according to claim 1, wherein the first subsection of the electronic display device and the second subsection of the electronic display device are simultaneously displayed on the electronic display device.

* * * * *